March 14, 1944.   R. J. RINEHART   2,344,062
CHILD'S VEHICLE
Filed Oct. 31, 1941   2 Sheets-Sheet 1

INVENTOR
R. J. Rinehart
BY
ATTYS

March 14, 1944.  R. J. RINEHART  2,344,062
CHILD'S VEHICLE
Filed Oct. 31, 1941  2 Sheets-Sheet 2
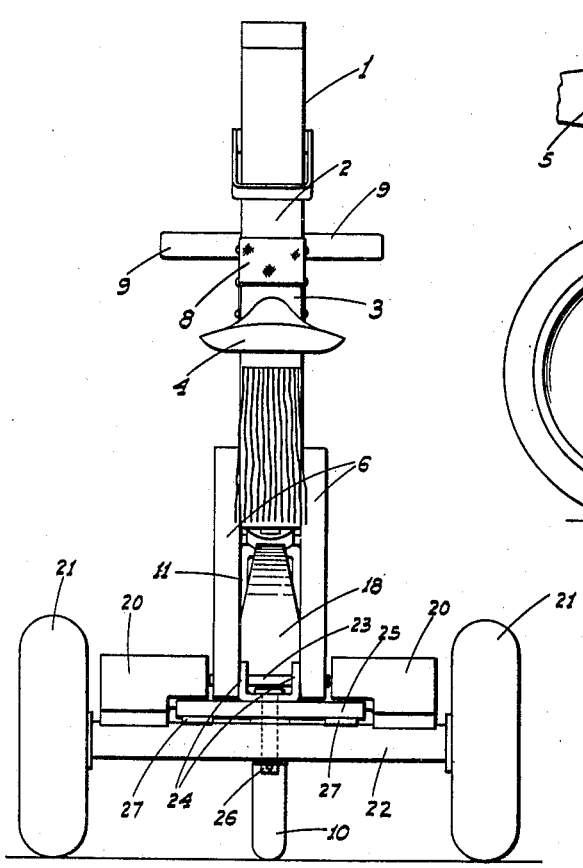
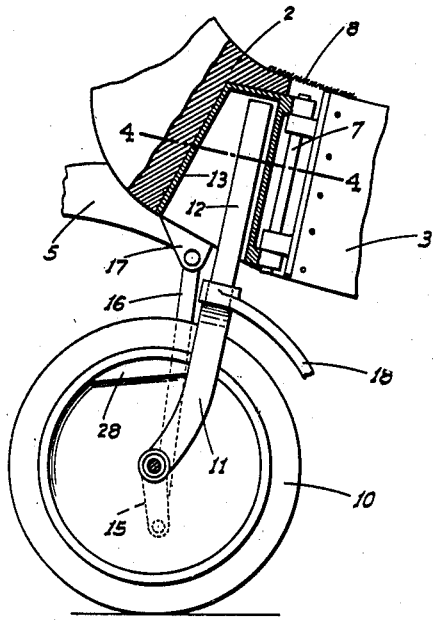
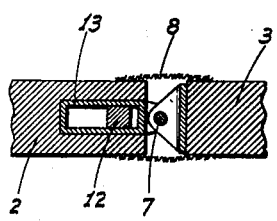
INVENTOR
R. J. Rinehart
BY
ATTYS Patented Mar. 14, 1944

2,344,062

UNITED STATES PATENT OFFICE 2,344,062

CHILD'S VEHICLE

Roscoe J. Rinehart, Isleton, Calif.

Application October 31, 1941, Serial No. 417,281

6 Claims. (Cl. 280—1.13)

This invention relates in general to child's vehicles and in particular is directed to a unique form of occupant-propelled vehicle for children.

The principal object of the invention is to provide a wheeled children's vehicle which includes a body in the form of a fanciful representation of a horse; the action of the body, upon which the child seats, simulating the motion of a galloping horse when the vehicle is in motion, and providing valuable exercise as well as pleasure for the child.

A further object of the invention is to provide a child's vehicle as above which includes unique mounting and driving means between the articulated body and the body supporting wheels.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Figure 2 is a rear end elevation of the vehicle.

Figure 3 is a fragmentary elevation partly in section showing the connecting and drive means between the steerable front wheel of the vehicle and the forward section of the vehicle body.

Figure 4 is a fragmentary section on the line 4—4 of Fig. 3.

Figure 1:
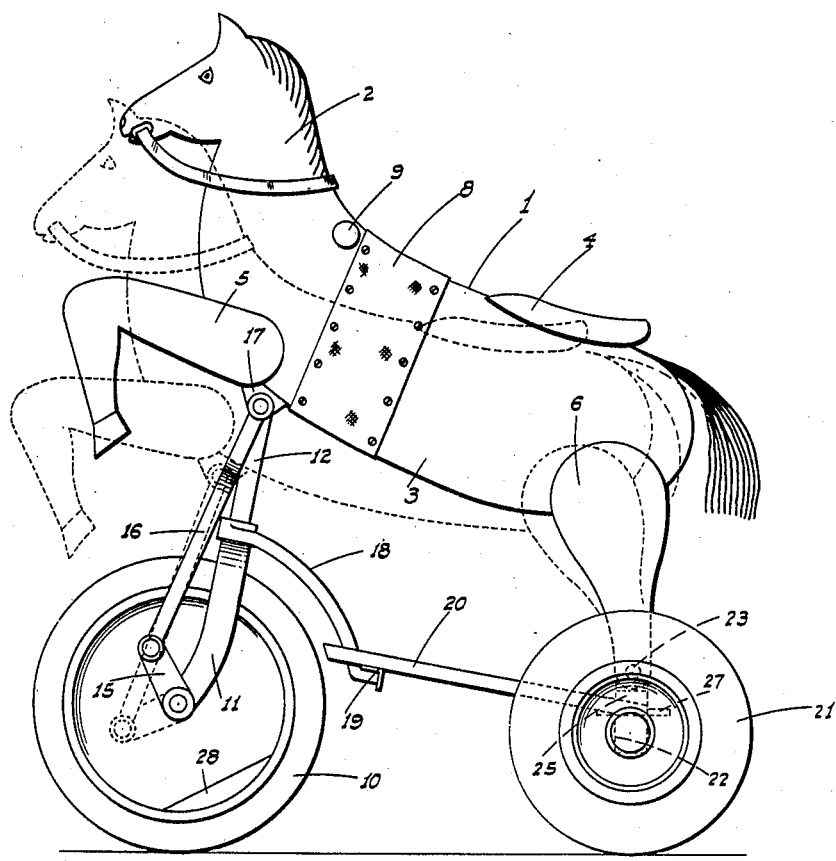
Figure 1 is a side elevation of the improved child's vehicle.

Referring now more particularly to the characters of reference on the drawings, my hobby-horse vehicle for children comprises a body 1 which is in the form of a fanciful representation of a horse; this body being sectional, the forward section being indicated at 2 and the rear section being indicated at 3. A saddle 4 is secured atop the rear section 3. Transversely spaced front legs 5 and rear legs 6 are rigidly secured on and depend from corresponding body sections 2 and 3 respectively.

The adjacent ends of body sections 2 and 3 are spaced apart somewhat but are connected together in articulated relation by a substantially vertical hinge assembly indicated generally at 7, whereby relative swinging movement from side to side may occur between the forward and rear sections of the body. The gap between adjacent ends of sections 2 and 3 is bridged on the outside of the body by a flexible boot 8 secured along its edges to corresponding portions of said sections.

Handles 9 project rigidly from forward section 2 of the body ahead of boot 8 and adjacent the top edge of said section, these handles being positioned within easy reach of a child seated on saddle 4.

The forward section 2 of the body is supported by a single centrally disposed wheel 10 journaled between an upstanding fork 11 which includes an upstanding stem 12 rectangular in cross section. This stem projects into a socket 13 formed in body section 2 and open to the lower edge thereof, such socket transversely being of a width to engage opposite sides of stem 12 with an easy running fit, while lengthwise of the vehicle the socket is of considerably greater length than the corresponding diameter of the stem, whereby to permit of relative swinging movement in a vertical plane between forward body section 2 and said stem, together with the connected fork 11 and wheel 10 mounted in the latter.

The axle 14 of wheel 10 projects at opposite ends beyond fork 11 and at each end is fitted with a crank 15, the cranks being parallel and alined transversely of the vehicle. Connecting rods 16 are pivotally connected between said cranks and transversely spaced ears 17 mounted on the under side of the body slightly on opposite sides of socket 13.

At the top the fork 11 is turnably mounted in connection with the upper end of curved frame member 18 which extends rearwardly and downwardly to a termination some distance above ground level, where it is connected by a cross bar 19 with the forward end portion of transversely spaced foot rests 20 which extend rearwardly at a gradual downward slope.

The rear section 3 of the body is supported by a wheel assembly which includes transversely spaced wheels 21 connected by means of a rigid axle 22; the rear end portions of foot rests 20 seating atop and being secured to axle 22.

The transversely spaced rear legs 6 are pivoted at their lower ends on a cross pin 23 which is supported by ears 24 disposed between said legs, these ears being secured to a crossbar 25. A pivot bolt 26 extends through said bar, as well as through the axle 22 centrally of the ends of the latter, whereby the rear section 3 may have limited rotative movement relative to axle 22 and in a horizontal plane, as necessitated by the face that the hinge connection between the body sections is disposed some distance rearwardly of the stem 12. Longitudinally extending shoes 27 fixed on the axle adjacent opposite sides of the bar support the bar at all times to prevent undesirable lateral tilting thereof.

During use of the vehicle the child is seated on saddle 4 with its feet on transversely spaced foot rests 20. Thereupon the handles 9 are grasped and an alternate up and down action applied thereto. This results in the body 1 moving in a manner to simulate the galloping of a horse, the body pivoting about pin 23 as an axis. With such movement the connecting rods 16 impart rotation to the front wheel 10, driving the vehicle forward. The wheel 10 is provided with a counterbalance 28 in order to effect smooth action of the wheel drive.

It will be seen that by virtue of the fact that the body sections 2 and 3 are articulated, the vehicle is steered by turning the forward section in one direction or the other, as desired. When said section is turned the wheel 10 turns correspondingly for the reason that stem 12 is non-rotatable in socket 13, while being relatively movable lengthwise of the vehicle to compensate for the up and down motion of the body.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A child's vehicle comprising a rear wheel assembly including transversely spaced wheels, a centrally disposed front wheel, a longitudinal body disposed above said wheels, means pivoting the body adjacent its rear end on the rear wheel assembly for rocking movement of said body in a vertical plane, means connecting the front wheel with the rear wheel assembly in unitary but steerable relation thereto, the body being articulated intermediate its ends for lateral hinging movement, means connecting the front wheel with the forward portion of the body for unitary steering movement while permitting alternate relative separating and approaching movement thereof, and means between the body and front wheel to rotate the latter upon such alternate movement.

2. A child's vehicle comprising a rear wheel assembly including transversely spaced wheels, a centrally disposed front wheel, a longitudinal body disposed above said wheels, means pivoting the body adjacent its rear end on the rear wheel assembly for rocking movement of said body in a vertical plane, a front wheel fork, a rigid frame member extending rearwardly from said fork, the fork being turnable in said member, transversely spaced foot boards, one disposed to each side of and below the body, means connecting said foot boards adjacent their rear ends with said wheel assembly, means rigidly connecting said boards adjacent their forward ends with the rear end of said frame member, the body being articulated intermediate its ends for lateral swinging movement, means connecting said front wheel fork with the forward portion of the body for unitary steering movement while permitting alternate relative separating and approaching movement thereof, and means between the body and front wheel to rotate the latter upon such alternate movement.

3. A child's vehicle as in claim 2 in which said last named means comprises cranks on the front wheel beyond the legs of the fork, and connecting rods pivotally connected between said cranks and the forward portion of the body.

4. A device as in claim 2 in which said first named means includes a rigid element on and depending from the body, a member fixed on the lower end of said element, said member seating on a portion of the wheel assembly intermediate the rear wheels, and means pivoting said member on said portion for relative rotation in a substantially horizontal plane.

5. A child's vehicle comprising a longitudinal body disposed above the ground, said body including a forward and rearward section, means connecting said sections together at adjacent ends in articulated relation for relative side to side swinging motion, a seat on the rear section, a front and rear ground engaging wheel disposed beneath the body in longitudinally spaced relation, means mounting the body in connection with the wheels for relative rocking movement in a vertical plane and about an axis adjacent the rear wheel, a crank on the front wheel, and a connecting rod pivotally connected between said wheel crank and the body whereby upon rocking movement of the body the front wheel is rotated; said body mounting means including a front wheel fork, means mounting the fork in connection with the rear wheel for relative steering movement, a stem upstanding from the fork, and the body having a downwardly opening socket into which said stem projects in relative non-turnable but longitudinally swingable relation.

6. A child's vehicle comprising a longitudinal body disposed above the ground and having a seat thereon, a front and rear ground engaging wheel disposed beneath the body in longitudinally spaced relation, means mounting the body in connection with the wheels for relative rocking movement of said body in a vertical plane about an axis adjacent the rear wheel, a portion of said body mounting means being vertically immovable relative to said wheels, foot rests disposed on opposite sides of the body rearwardly of the front wheel, said foot rests being fixedly secured on said vertically immovable portion of the body mounting means, a crank on the front wheel, and a connecting rod pivotally connected between said wheel crank and the body whereby upon rocking movement of the body by a child on the seat and when the child's feet are on said fixed foot rests the front wheel is rotated.

ROSCOE J. RINEHART.